Patented Sept. 16, 1947

2,427,513

UNITED STATES PATENT OFFICE 2,427,513

PROCESS OF DISPERSING COPOLYMER OF VINYL CHLORIDE AND VINYL ACETATE IN A KETONE AND HYDROCARBON DISPERSANT

Clayton I. Spessard, Pittsburgh, Pa., assignor to Carbide and Carbon Chemicals Corporation, a corporation of New York No Drawing. Application March 3, 1944, Serial No. 524,911

4 Claims. (Cl. 260—32)

This invention relates to a method for suspending in nonaqueous media vinyl polymers containing combined vinyl chloride, which are of limited solubility in the usual organic solvents. It also pertains to the stable suspensions made by such process, and to coating processes employing such suspensions.

Many artificial resins containing polymerized vinyl chloride have valuable film-forming properties by reason of their tensile strength, high softening point and chemical inertness, but are difficult to disperse as coating or film-forming compositions by reason of the limited solubility of such resins in the available organic solvents. Some of such resins are virtually insoluble in the common organic solvents at ordinary temperatures, while sufficient amounts of others to be practical cannot be dissolved in the solvents without the solutions becoming unduly viscous or gelling. When articles are coated with dilute solutions, multiple coats must be applied to secure the requisite coating thickness, and large volumes of solvents are necessarily handled. Resins of the first class include delta polyvinyl chloride, while the second class of resins includes beta polyvinyl chloride, copolymers of vinyl chloride with vinyl acetate, which have molecular weights above 16,000, as determined by Staudinger's method, and vinyl chloride contents within the range of 90 to 99%, as well as copolymers of vinyl chloride with maleate esters and acrylate esters, such as dibutyl maleate, ethyl acrylate, methyl acrylate, and methyl methacrylate of substantially the same combined vinyl chloride content and molecular weight. Resins, such as the copolymers of vinyl chloride with acrylonitrile, containing from 45 to 80% vinyl chloride, which are soluble in acetone but insoluble in many other solvents, and the copolymers of vinyl chloride with vinylidine chloride have solubility characteristics intermediate to these classes, depending on their molecular weight. All of such resins may be characterized by being at least swellable by acetone, but acetone has no greater solvent action on them than it does on a copolymer of vinyl chloride with vinyl acetate having a molecular weight of 16,000 and a vinyl chloride content of 90%. A 20% solution of this resin in a mixture of 50 parts of acetone and 50 parts of toluene by volume has a viscosity of 31 seconds at 25° C. in an A. S. T. M. cup with a 0.15 inch orifice. All of the resins are substantially insoluble in toluene.

These resins may be prepared by known methods, including polymerization of the vinyl chloride, together with one or more other monomers if desired, in solution, or in the absence of solvents or diluents. The suspension of resins made by the latter process is the particular object of this invention, since such resins, being of high molecular weight, are extremely difficult to dissolve.

While some degree of success has been obtained in coating articles with hot solutions of these vinyl chloride resins, problems of gelation are encountered if the hot solution cools too rapidly before the solvent is evaporated or if the reservoir for the coating solution is not heated uniformly; and the hazards of fire and toxicity are naturally increased.

Aqueous dispersions of vinyl chloride resins are also known which result from emulsifying vinyl chloride, with or without another polymerizable material, in water and subjecting the emulsion to conditions which favor polymerization. It has been proposed to add plasticizers to such dispersions, either before or after polymerization, and to use the dispersions for coating purposes. Such products have certain advantages, but are also subject to limitations. These suspensions or hydrosols, as they are frequently termed, lack stability and the water causes shrinkage of paper and cloth and rusting of iron and steel when the hydrosols are employed to coat such materials. In addition, it is difficult to blend modifying agents, such as waxes, plasticizers and other resins, in such hydrosols. Finally, these hydrosols often contain, as essential ingredients in the polymerization, water-dispersible protective colloids and polymerization catalysts, such as peroxides, which reduce the resistance of the finished coatings to water, light and chemical reagents.

Finally, it has been proposed to disperse soluble resinous bases in organic non-solvents by subjecting the mixture to intensive mechanical high speed disintegration in a colloid mill. This method can not be utilized with the hard, tough, relatively insoluble vinyl chloride resins in question, because the requisite disintegration cannot be obtained to form stable suspensions, and the heat evolved in the grinding process, even when efficient cooling is employed, causes the resin to swell excessively, particularly when the dispersion medium itself has a swelling action on the resin, and renders the process impractical because the tendency of the resin particles to gel and agglomerate is more than the disintegrating forces can overcome.

It has now been found that stable, non-aqueous fluid suspensions of difficulty soluble vinyl polymers containing combined vinyl chloride can be obtained by grinding the resins in a liquid mixture having a controlled swelling action on the resin, together with pigments, plasticizers or other modifying agents, under such relatively slow grinding speeds that the temperature may be kept below about 50° C. Liquid mixtures having a controlled swelling action comprise mixtures of liquid ketones and liquid hydrocarbons in certain specified proportions depending on the nature of the hydrocarbon. For mixtures of liquid ketones with aromatic hydrocarbons, or with predominantly aromatic hydrocarbon diluents, the percentage of ketone in the mixture is from 10 to 30% by weight. For mixtures of liquid ketones with acyclic or cycloaliphatic hydrocarbons, or with predominantly acyclic or cycloaliphatic hydrocarbon diluents, the percentage of ketone in the mixture is 25 to 50%. The specified mixtures of ketones and hydrocarbons partially solvate, but do not dissolve, the resins, which are transformed to a swollen, softened condition. In such a state, the relatively slow grinding process, provided the temperature is kept below about 50° C., will permit the agglomerated resin particles, which may be, and frequently are associated with pigments and plasticizers, to be broken down into such fine particles that a stable colloidal suspension of the resin particles in the ketone-hydrocarbon mixture is formed. By "relatively slow grinding speeds" is meant the speeds prevalent in the more common grinding apparatus (R. P. M. 22 to 350), as distinguished from the attrition or colloid mill (R. P. M. 1000 to 13,000).

In other words, my process depends on the controlled solvating action of the dispersing medium in conjunction with some agitation to reduce the particle size of the suspended solids, rather than on intense mechanical disintegration, which is the principle of the colloid mill, as developed by Plauson.

The suspensions which result are to be distinguished from what are termed "colloidal solutions or dispersions" of the same or related vinyl resins in ketone-hydrocarbon mixtures containing larger amounts of ketones in that the size of the suspended particles is larger than the dissolved resin particles. As a result, suspensions are opaque to transmitted light, even in the absence of pigments and the like. The suspensions are also to be distinguished from solutions by other characteristics including their behavior on dilution with additional amounts of a ketone or a hydrocarbon. A solution of a vinyl chloride resin in a ketone-hydrocarbon mixture, in general, will become more viscous on the addition of more hydrocarbon; and the solution will become less viscous on dilution with a ketone (although some mixtures behave anomalously over part of the range). The opposite is true of the suspensions. They increase in consistency upon the addition of more of a ketone, and they flow more readily upon dilution with a hydrocarbon provided sufficient hydrocarbon is not added to result in breaking of the suspension. Best results are obtained by diluting the suspension with a mixture containing the same ketones and hydrocarbons, but with a lower ratio of ketone to hydrocarbon. Furthermore, suspensions exhibit pseudoplasticity when subjected to stress, whereas colloidal solutions tend to exhibit more truly viscous flow, and the suspensions exhibit thixotropism to a more marked degree. (See "Chemical Engineers Handbook," 1934 edition, pages 1271–1274.)

From what has been stated, it should be appreciated that the ratio of ketone to hydrocarbon is critical in forming the suspensions. If less than the specified amounts of ketone are present in any given ketone-hydrocarbon mixture, the mixture will have insufficient solvating power for the resins to which this invention is particularly directed to permit disintegration of the resin particles on grinding and problems of suspension stability arise; if more than the specified amounts of ketone are present, the mixture has too great solvating power and difficulties with gelation are encountered.

In formulating for optimum results within the ranges stated, as further shown in the examples, consideration should be given to the specific solvent characteristics of the particular ketone and hydrocarbon involved. Some ketones, such as mesityl oxide, isophorone, cyclohaxanone, and methyl cyclohaxanone, will dissolve most of the aforesaid vinyl chloride resins to the extent of about 4 to 22 grams of resin per 100 c. c. of solvent at 40° C., while other ketones, such as acetone, methyl ethyl ketone, methyl isobutyl ketone and diisobutyl ketone will not dissolve appreciable quantities of these resins at ordinary temperatures. Also, some liquid hydrocarbons, such as the aromatic hydrocarbons, although non-solvents, have considerable swelling power for these vinyl chloride resins, whereas acyclic or cycloaliphatic hydrocarbons have little or no swelling power for the resins. Many commercial diluents are mixtures of the two types of hydrocarbons and have intermediate properties. Suitable aromatic hydrocarbons include benzene, toluene, xylene, terpenes or tetrahydronaphthalene; suitable cyclic or cycloaliphatic hydrocarbons include cyclohexene, cyclopentane, cyclohexane, while appropriate acyclic hydrocarbons include hexane, heptane, octane, nonane, decane and their various branched chain isomers. Mixtures of various ketones and different hydrocarbons may be employed, and the action of the ketones and hydrocarbons may be modified by the addition of other solvents, swelling agents, or non-solvents.

The consistency of the suspensions depends on the concentration of the difficultly soluble vinyl chloride resins in the suspending mixture of ketones and hydrocarbons. It is usually most practical to disperse from 10 to 25 parts of the resin with 90 to 75 parts by weight of the liquid mixture. The suspensions thus produced vary from thin, highly mobile liquids to thick, slowly flowable compositions.

An appropriate grinding operation is of the utmost importance in forming stable suspensions of the aforementioned vinyl resins in the ketone-hydrocarbon mixtures. As previously stated, the grinding cannot be carried out successfully, even in the presence of the ketones, in high speed colloid mills because poor dispersions result, and excessive swelling of the resin and thickening of the dispersion occurs because of heat development. It has been found that the temperature developed in the grinding operation should be kept below about 50° C. for the production of stable, flowable suspensions, and the slow but effective grinding afforded by the ball mill is ideal for forming the present suspensions. Any type of ball mill may be employed, and it may be equipped with flint, porcelain or steel balls of small, large or mixed sizes. Cooling means should preferably be provided. When thick suspensions are to be prepared, slow speeds of grinding should be observed to permit proper fall of the balls through the mass. The grinding operation may take from twelve hours to two or three days. After a milling time of about 40 hours, the size of the suspended particles may be about 4 to 5 microns or smaller. Somewhat better suspensions result if the ketones and hydrocarbons are added to the resin already mixed, although the order of addition is not of particular importance, and the resin may be added to the hydrocarbons, with the ketones added later.

The ball mill may be charged directly with the pulverulent resin, pigment, plasticizer, and mixture of ketone and hydrocarbon, but certain unexpected advantages are obtained by pre-sheeting the resin with part or all of the plasticizers and pigments prior to the grinding operation despite the much larger size of resin pieces then initially placed in the ball mill. This pre-sheeting or pre-compounding operation may be carried out by working the resin together with a plasticizer and pigment on a two-roll rubber mill at a temperature of 125° to 145° C. for 2 to 5 minutes. Higher temperatures and longer mixing times are not necessarily beneficial since a stock more difficult to disperse often results. Other methods of pre-compounding may be employed, including the use of heated dough-type mixers, but, in such event, the mass should preferably be sheeted before grinding in the ball mill. In either instance, the sheet may be cut into any convenient number of pieces and charged to the ball mill.

The above two-stage grinding procedure has resulted in certain definite advantages over a single grinding operation which may be summarized as follows:

(a) The time of grinding in the ball mill is lessened.

(b) The suspensions produced are smoother and more finely-divided, and they have greater stability.

(c) The suspensions have a lower consistency and they flow more readily.

(d) Coatings produced from the suspensions have higher gloss and smoothness, and their tensile strength, abrasion resistance and fatigue resistance are improved.

(e) Lower quantities of plasticizer are required for equivalent flexibility.

If clear suspensions are to be prepared, the above procedure may also be carried out, omitting the pigments in the pre-compounding operation. Also, a clear stock may be pre-ground, and a pigment added during the ball milling operation. Where the ultimate ratio of plasticizer to resin is one or higher, it is often desirable to add part of the plasticizer when the pre-compounded stock is ground on the ball mill.

The amount of plasticizer employed in the suspension depends on the flexibility desired as well as the amount of pigment present. In general, the amount of plasticizer may vary from 10 to 150% by weight of the resin. Any compatible plasticizer may be employed, such as di-2-ethylhexyl phthalate, tricresyl phosphate, dibutyl sebacate, di(beta-butoxyethyl) phthalate, methyl phthalyl methyl glycollate and the like. A number of suitable plasticizers are evaluated in an article by M. C. Reed, "Behavior of plasticizers in vinyl chloride-acetate resins," Industrial and Engineering Chemistry, vol. 35, page 896 (1943). Other modifying agents, such as paraffin wax, chlorinated diphenyl, chlorinated naphthalene, lubricants, dyes and resin stabilizers may be added to the ball mill in preparing the suspensions.

Strong and tough films may be prepared from the suspensions by simple procedures. Cloth may be coated readily with the compositions by spreader or knife coating methods; paper may be coated by the usual roll coating machines, and metal may be coated by roller coating, dipping or spraying, or by drawing the metal sheet or wire through the suspensions. Films may be cast from the suspensions employing the usual revolving drum type or continuous belt type machines. The suspensions may also be applied to surfaces by brushing, slushing or dipping. In either instance, the films or deposited coatings should be baked at temperatures of at least 215° F. to insure complete fluxing of the resin particles and resulting homogeneity of the films, as well as to increase the tensile strength and flexibility of the films. For best results, baking temperatures of 300° to 350° F. are preferred. When so treated, films and coatings prepared from the suspensions have physical properties comparable to those of films deposited from solutions. However, it has been observed that more plasticizer is required in the suspensions to give films having flexibility equal to films cast from solutions.

To secure films of good tensile strength, it is important that the particle size of the suspensions be sufficiently small. For instance, a film containing equal amounts of di(2-ethylhexyl) phthalate and a copolymer of vinyl chloride with vinyl acetate, containing about 95% vinyl chloride and having an average molecular weight of about 24,000, after baking for 30 minutes at 300° F., had a tensile strength of about 8000 to 9000 p. s. i. when deposited from a suspension having an average particle size of about 4 microns, but the tensile strength of a film deposited from a suspension of the same composition but having a mean particle size of about 28 microns was only 2000 p. s. i. In general, the particle size of the suspensions should be less than about 10 microns, while an average particle size of about 1 micron is most desirable. The particle size of the suspensions depends on the time of milling.

Films deposited from suspensions do not retain the ketone-hydrocarbon solvating mixture for as long a period as do films deposited from true solutions, and thus they are said to have a more rapid "solvent release." Accordingly, films deposited from suspensions dry more rapidly.

In coating cloth, the weight of the coating may be varied from 2 to 7 ounces per square yard, as an example, and this film thickness may be built up either in single or multiple coats. A thick suspension is desirable in order to prevent "strike-through" of the cloth. If desired, a primer coating may be deposited from a solution of a suitable resin, such as a copolymer of vinyl chloride and vinyl acetate, a copolymer of butadiene and acrylonitrile or a copolymer of vinyl chloride, vinyl acetate and maleic acid as described in U. S. Patent No. 2,329,456 to W. E. Campbell, Jr. To secure adequate adhesion of the coating to the cloth, baking temperatures of 300° F. are recommended, although baking temperatures as low as 215° F. may be employed. In tests, an adherence as high as 7 to 9.5 pounds per inch have been obtained, as measured by the force required to separate strips one inch wide from the cloth. If desired, the first coat deposited from the suspension or the primer coating deposited from solution, may be baked at temperatures of 300° F., and the subsequent coats baked at lower temperatures. Also, an initial low temperature bake followed by a high temperature bake results in coatings of good adhesion. Adhesion of the coating to the cloth may also be improved by calendering the primer coated cloth before the application of the top coats. In multiple coatings, subsequent coatings do not tend to "lift" the bottom layer as is sometimes the case when multiple coats are applied from solutions.

Because the films deposited from suspensions release the ketone-hydrocarbon mixture very rapidly, an innovation in coating cloth by applying a heavy coating in a single pass of the cloth through a knife-coating machine has been accomplished. In solution coating, many coats are usually applied to develop the desired coating thickness. In forming these thick coatings, i. e., having a coating weight of about 4 to 7 ounces per square yard, the usual practice is modified by supporting the cloth as it passes under the doctor blade on a solid surface, such as a roll or rod. The doctor blade is then held at the proper distance, i. e., about 0.015 to 0.03 inch above the cloth to give the desired coating thickness. The coated cloth may be used in making raincoats, tarpaulins, tents and many other cloth articles currently being coated with vinyl resins by calendering and from solution.

Surfaces, other than cloth and paper, may be coated with these compositions, such as those of glass, steel, aluminum, copper, wood, plaster board, various plastic materials, rubber, nylon and other fabrics made of synthetic resin yarn. Corrosion-resistant tank and pipe linings can be made from the suspensions.

The suspensions may be employed as adhesives for textiles, metal, paper, leather and vinyl resin sheet material, especially where heat-sealing is involved.

Instead of coating cloth with a continuous film, cloth or other porous material may be lightly impregnated with the suspension without eliminating the porosity of the fabric. If the cloth has been first treated with a water repellent, such as "Zelan," a very useful fabric for making tents, coats, jackets and the like results.

Clear suspensions, containing little or no plasticizer, may be applied as wire enamels by drawing the wire one or more times through a bath containing the suspension, and then baking the coated wire. The plasticized films deposited from the suspensions also have good electrical resistance, and may be used for insulating parts of electric motors, electroplating installations, cables and the like.

Formed, hollow articles, such as gloves, balloons, and the like may be fashioned from the suspensions by dipping a form into the suspension, removing the form and baking, and withdrawal of the article from the form.

In the following examples, the term "Resin A" will be used to identify a conjoint polymer of vinyl chloride with vinyl acetate, containing about 93 to 97% vinyl chloride, and having an average molecular weight of 22,000 to 25,000. Only 2.5 grams of this resin is soluble in 100 c. c. of methyl isobutyl ketone at 40° C. without gelation.

*Example 1*

The following composition was passed once through the rolls and then ground on a two-roll differential speed mill for 2–3 minutes at 140° C. with a rolling bank and continuous cutting of the stock.

|  | Parts |
|---|---|
| Resin A | 11.8 |
| Dioctyl(di(2-ethylhexyl) phthalate | 8.9 |
| Whiting | 6.0 |
| Yellow iron oxide pigment | 1.2 |
| Black iron oxide pigment | 1.1 |
| Lead titanate | 1.0 |

The resulting composition was then ground in a ball mill at a temperature below about 40° C. for about 48 hours with a mixture of 14.0 parts of acetone and 56.0 parts of a commercial hydrogenated petroleum naphtha, boiling range 200.3 to 275° F. containing about 73% aromatic hydrocarbons hereinafter termed "Diluent A." A thick, slowly flowable suspension resulted which is adapted for coating cloth.

The suspension was applied to cloth, using a knife-coating machine. The first coat was a thin primer coating, holding the cloth tight against a sharp blade. The two top coats were applied with a clearance of 16 mils between the blade and the cloth which was supported by a pipe. The final coating weight was 4.7 ounces per square yard. The coated cloth was baked for 2 to 5 minutes at 225° F. and for an additional 10 minutes at 310° F. The adhesion of the coating to the cloth was 5.1 pounds per inch, the coated cloth resisted a hydrostatic pressure of over 30 pounds, and the coating did not fail after being abraded for 68 minutes according to an accelerated test in which the sample was clamped in a Wyzenbeck oscillating drum abrasion tester. Moderate pressure and tension were placed on the sample. The abrading surface was number 2/0 sandpaper.

*Example 2*

In a similar manner as described under Exemple 1, a suspension of the following composition was obtained:

|  | Per cent |
|---|---|
| Resin A | 12.3 |
| Dioctyl phthalate | 9.2 |
| Yellow iron oxide pigment | 1.3 |
| Black iron oxide pigment | 1.1 |
| Lead titanate | 1.0 |
| Whiting | 6.3 |
| Acetone | 10.3 |
| Methyl isobutyl ketone | 3.4 |
| Diluent A | 41.4 |
| Xylene | 13.7 |
|  | 100.0 |

Four coats of this suspension were applied over cloth which had received a primer coating deposited from a solution of a vinyl chloride-vinyl acetate resin containing 75% by weight on the resin of dioctyl phthalate. Because a solution primer was used, adequate adhesion of 5.2 pounds per inch was obtained at a low baking temperature of 215° F.

Example 3

The following ingredients were charged directly to a ball mill:

| | Per cent |
|---|---|
| Resin A | 11.9 |
| Dioctyl phthalate | 11.9 |
| Yellow iron oxide pigment | 1.0 |
| Black iron oxide pigment | 1.0 |
| Lead titanate | 0.8 |
| Whiting | 4.9 |
| Methyl isobutyl ketone | 11.9 |
| Isophorone | 6.5 |
| Diluent A | 50.1 |
| | 100.0 |

Grinding was carried out for about 48 hours at a temperature below 40° C., and a fluid, stable suspension obtained. However, by this method, it is noteworthy that a more active solvent, such as isophorone, is added and that somewhat higher ratios of ketone to hydrocarbon are employed.

A single coat of this suspension was applied to cloth. The cloth was supported on a pipe and there was a 20 mil clearance between the blade and the cloth. A coating weight (after baking) of 6.5 ounces per square yard resulted. The coating was baked at 225° F. for about 30 minutes, and then exposed to infra red light until the coating became glossy. The adhesion of the coating to the cloth was 7.0 pounds per inch, and the coated cloth resisted a hydrostatic pressure of over 30 pounds without leaking.

Example 4

The following suspension was prepared according to the process of Example 1:

| | Per cent |
|---|---|
| Resin A | 12.3 |
| Dioctyl phthalate | 9.8 |
| Yellow iron oxide pigment | 1.3 |
| Black iron oxide pigment | 1.1 |
| Lead titanate | 1.0 |
| Whiting | 6.2 |
| Acetone | 13.8 |
| Diluent A | 54.5 |
| | 100.0 |

Two primer coats were applied from this suspension, and baked at 295° to 300° F., followed by three top coats baked at 280° to 290° F. The final coating weight was 3.34 ounces per square yard, and the adhesion was 9.5 pounds per inch.

Example 5

A suspension of the following composition was prepared:

| | Per cent |
|---|---|
| Resin A | 20 |
| Dioctyl phthalate | 20 |
| Cyclohexanone | 10 |
| Diluent A | 50 |
| | 100 |

This suspension was spread on paper and baked at once for 30 seconds at 300° to 325° F. A fused, continuous protective film was formed on the paper. The suspension was thinned with additional hydrocarbon diluent, and applied to paper by spraying. Upon baking, a continuous film was obtained as before.

Example 6

The following composition was ground in a buhr-stone mill and a uniformly fine, smooth suspension of good stability was obtained:

| | Per cent |
|---|---|
| Resin A | 30 |
| Dioctyl phthalate | 12 |
| Isophorone | 12 |
| Terpene mixture (Solvent 30—Newport Industries) | 46 |
| | 100 |

The suspension was thinned by the addition of an aromatic hydrocarbon diluent, spread on glass, and baked at 250° F. A clear, strong film was obtained.

Example 7

The following composition was ground on a small ball mill, and a thick, pourable suspension of good stability obtained:

| | Per cent |
|---|---|
| Polyvinyl chloride (average molecular weight about 18,000) | 13.1 |
| Dioctyl phthalate | 13.1 |
| Whiting | 5.3 |
| Yellow iron oxide pigment | 1.0 |
| Black iron oxide pigment | 1.0 |
| Lead titanate | 1.0 |
| Methyl isobutyl ketone | 13.1 |
| Diluent A | 52.4 |
| | 100.0 |

Films from this composition were applied to surfaces of cloth, paper, pulpboard, glass, steel, tin plate and aluminum, and, after baking at 250° to 300° F., excellent protective films were obtained.

Example 8

The following composition was ground on a small ball mill, and a fluid, mobile suspension of good stability obtained:

| | Per cent |
|---|---|
| Resin A | 9.6 |
| Dioctyl phthalate | 1.9 |
| Blue lead | 11.5 |
| Methyl isobutyl ketone | 9.6 |
| Diluent A | 67.4 |
| | 100.0 |

The suspension was thinned with additional hydrocarbon diluent, and applied to surfaces of steel, tin plate and aluminum. After baking for 15 minutes at 425° F., adherent, protective films were obtained which did not soften or loosen on soaking in water for one week, nor was the metal corroded, indicating freedom from pinholes.

Example 9

In a manner similar to that described in Example 8, the following suspension was compounded and applied:

| | Per cent |
|---|---|
| Resin A | 9.8 |
| Dioctyl phthalate | 2.0 |
| Titanium dioxide | 9.8 |
| Methyl isobutyl ketone | 9.8 |
| Diluent A | 68.6 |
| | 100.0 |

Example 10

The following suspension was prepared as described in Example 8:

| | Per cent |
|---|---|
| Resin A | 14.0 |
| Dioctyl phthalate | 14.0 |
| Cyclohexanone | 16.6 |
| Methyl isobutyl ketone | 5.6 |
| Diluent A | 16.6 |
| Acyclic hydrocarbon diluent | 33.2 |
| | 100.0 |

This suspension was spread over paper, and baked at about 350° F. for about 30 seconds. An adherent, protective film was formed which had good resistance to oils, grease, chemicals and water.

Films of good tensile strength and flexibility after baking were also cast from this solution.

Glass flasks were lined with the suspension by slush-coating, and, after drying and baking, the deposited film was removed in the shape of a bag or balloon. Similarly, various products were made by dipping forms into the suspension, baking the form, and removing the formed article.

Example 11

The following suspension illustrates the use of a suspending media comprising a solvent ketone for the resin in admixture with an aromatic hydrocarbon diluent and an acyclic hydrocarbon diluent:

| | Parts |
|---|---|
| Resin A | 14.8 |
| Dioctyl phthalate | 13.6 |
| Pigment and filler | 10.2 |
| Isophorone | 10.2 |
| Diluent A | 28.4 |
| Acyclic hydrocarbon diluent | 14.8 |

Example 12

The following suspension was prepared as in Example 1:

| | Per cent |
|---|---|
| Resin A | 12.3 |
| Dibutyl phthalate | 6.1 |
| Methyl phthalyl ethyl glycollate | 0.4 |
| Whiting | 1.2 |
| Acetone | 15.0 |
| Diluent A | 65.0 |
| | 100.0 |

This suspension has excellent properties as a thermoplastic adhesive for paper, cloth, leather and the like, and is valuable for this purpose in making milk bottle hoods of the heat-sealed type. It is also useful in coating paper containers.

Example 13

The following clear suspension was prepared as in Example 1:

| | Per cent |
|---|---|
| Resin A | 14.8 |
| Tricresyl phosphate | 4.4 |
| Calcium ethylacetoacetate | 0.3 |
| Acetone | 16.1 |
| Diluent A | 64.4 |
| | 100.0 |

It was found that this suspension could be diluted approximately 20% with the hydrocarbon mixture, and could be diluted 50% with a mixture of 10 parts of acetone and 90 parts of the hydrocarbon mixture. Acetone alone caused immediate thickening.

The suspension was thinned 21.5% with a mixture of equal parts of isophorone and Diluent A, and a film cast on glass. After drying for 20 minutes at 350° F., the resultant film was clear and flexible.

The above suspension is also useful where an electrically insulating, fire-resistant coating is desired.

Example 14

The following composition was ground on the two-roll mill:

| | Per cent |
|---|---|
| Resin A | 54.7 |
| Tricresyl phosphate | 24.8 |
| Dioctyl phthalate | 12.0 |
| Litharge | 5.0 |
| Carbon black | 1.0 |
| Mineral oil | 1.0 |
| Fused lead stearate | 0.5 |
| Phthalic anhydride | 1.0 |
| | 100.0 |

The resulting stock was ground in a ball mill to give a suspension of the following composition:

| | Per cent |
|---|---|
| Stock | 20 |
| Acetone | 16 |
| Cyclohexanone | 4 |
| Toluene | 48 |
| Xylene | 12 |
| | 100 |

Copper wires were coated with this suspension by drawing them through the suspension, and baking the coating at 300° to 350° F. Adherent, flexible coatings were formed on the wire having good insulating qualities.

Example 15

Viscose yarn was coated with two coats of the following suspensions:

| | A | B |
|---|---|---|
| | Per cent | Per cent |
| Resin A | 15.0 | 16.0 |
| Dioctyl phthalate | 1.5 | 8.0 |
| Acetone | 23.0 | 19.3 |
| Diluent A | 60.5 | 56.7 |
| | 100.0 | 100.0 |

The thread was coated by drawing it through from a spool over a tension device, into the suspension, and then through a four foot oven. After each coat, the yarn was baked for three minutes at 300° to 350° F. The yarn coated with the less highly plasticized suspension "A" had a tensile strength 52% higher than the uncoated yarn, whereas the yarn coated with more highly plasticized suspension "B" had a tensile strength 30% higher than the uncoated yarn, and the elongation characteristics of the yarn were better than the yarn coated with the less highly plasticized suspension. Coating "A" increased the knotted tensile strength of the viscose 44%, and coating "B" increased the knotted tensile strength 35%. The coated yarns are useful in making screens, inner soles for shoes, and other applications where a stiff fabric is desired.

Example 16

Stiff bristles were made by coating threads with the following suspension:

|  | Per cent |
| --- | --- |
| Resin A | 16.4 |
| Dioctyl phthalate | 1.6 |
| Acetone | 22.5 |
| Diluent A | 59.5 |
|  | 100.0 |

It will be apparent from the foregoing examples that the present invention makes possible a widespread adaptation of difficultly soluble vinyl chloride resins for coatings.

I claim:

1. Process for dispersing a copolymer of vinyl chloride with vinyl acetate having an average molecular weight above 16,000 and a combined vinyl chloride content of 90 to 97%, which comprises grinding 10 to 25 parts of said copolymer in a grinding apparatus at a speed of 22 to 350 R. P. M. and at a temperature below 50° C. with 90 to 75 parts of a dispersant selected from the group consisting of mixtures consisting of 10 to 30% of a liquid ketone and 70 to 90% of liquid hydrocarbons predominantly aromatic in structure and mixtures consisting of 25 to 50% of a liquid ketone and 50 to 75% of liquid hydrocarbons predominantly aliphatic in structure, and forming a fluid stable suspension of said copolymer in said dispersant in which the suspended solid particles have an average diameter less than about 10 microns.

2. Process for dispersing a copolymer of vinyl chloride with vinyl acetate having an average molecular weight above 16,000 and a combined vinyl chloride content of 90 to 97% which comprises grinding 10 to 25 parts of said polymer in a grinding apparatus at a speed of 22 to 350 R. P. M. and at a temperature below 50° C., with 90 to 75 parts of a mixture consisting of 10 to 30% of a liquid ketone and 70 to 90% of liquid hydrocarbons predominantly aromatic in structure, and forming a fluid stable suspension of said polymer in said mixture in which the suspended solid particles have an average diameter less than about 10 microns.

3. Process for dispersing a copolymer of vinyl chloride with vinyl acetate having an average molecular weight above 16,000 and a combined vinyl chloride content of 90 to 97% which comprises ball milling 10 to 25 parts of said copolymer at temperatures below 50° C. with a plasticizer and 90 to 75 parts of a mixture consisting of 15 to 25% of a liquid ketone and 75 to 85% of a predominantly aromatic hydrocarbon diluent, and forming a fluid stable suspension of said copolymer in said mixture in which the suspended solid particles have an average diameter less than about 5 microns.

4. Process for dispersing a copolymer of vinyl chloride with vinyl acetate having an average molecular weight above 16,000 and a combined vinyl chloride content of 90 to 97% which comprises grinding 10 to 25 parts of said polymer in a grinding apparatus at a speed of 22 to 350 R. P. M. and at a temperature below 50° C., with 90 to 75 parts of a mixture consisting of 25 to 50% of a liquid ketone and 50 to 75% of liquid hydrocarbons predominantly aliphatic in structure, and forming a fluid stable suspension of said polymer in said mixture in which the suspended solid particles have an average diameter less than about 10 microns.

CLAYTON I. SPESSARD.

REFERENCES CITED

The following references are of record in the file of this patent:

UNITED STATES PATENTS

| Number | Name | Date |
| --- | --- | --- |
| 1,976,433 | Cheetham | Oct. 9, 1934 |
| 2,279,771 | Austin | Apr. 14, 1942 |